(12) United States Patent
Kim (10) Patent No.: US 8,810,534 B2
(45) Date of Patent: Aug. 19, 2014

(54) DISPLAY DEVICE WITH AN EMBEDDED TOUCH PANEL AND A METHOD OF MANUFACTURING THE SAME

(75) Inventor: Tae-Hwan Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 365 days.

(21) Appl. No.: 13/226,901

(22) Filed: Sep. 7, 2011

(65) Prior Publication Data

US 2012/0075214 A1 Mar. 29, 2012

(30) Foreign Application Priority Data

Sep. 28, 2010 (KR) ........................ 10-2010-0093641

(51) Int. Cl.
*G06F 3/041* (2006.01)
*G06F 3/044* (2006.01)

(52) U.S. Cl.
CPC ...... *G06F 3/041* (2013.01); *G06F 2203/04107* (2013.01); *G06F 3/044* (2013.01); *G06F 2203/04103* (2013.01)
USPC ........................................ 345/173; 345/156

(58) Field of Classification Search
CPC ............ G06F 2203/04103; G06F 2203/04107; G06F 3/041; G06F 3/044
USPC ................................................ 345/156–173
See application file for complete search history.

(56) References Cited

U.S. PATENT DOCUMENTS

| 5,940,526 A | * | 8/1999 | Setlak et al. | 382/124 |
| 2005/0110103 A1 | * | 5/2005 | Setlak | 257/414 |
| 2008/0203279 A1 | * | 8/2008 | Kobashi | 250/216 |
| 2009/0268145 A1 | * | 10/2009 | Anjo et al. | 349/141 |

FOREIGN PATENT DOCUMENTS

| CN | 101256294 A | 9/2008 |
| CN | 101634922 A | 1/2010 |

OTHER PUBLICATIONS

Office Action issued in counterpart Chinese Patent Application No. 201110319062.5 dated Nov. 28, 2013.

* cited by examiner

*Primary Examiner* — Viet Pham
(74) *Attorney, Agent, or Firm* — Morgan, Lewis & Bockius LLP

(57) ABSTRACT

The present invention relates to a display device with an embedded touch panel which eliminates FPC mounted to a shielding electrode for applying a shielding signal to the shielding electrode, to reduce a cost and simplify a fabrication process.
The touch panel embedded display device includes a liquid crystal panel having an upper substrate and a lower substrate faced to each other with liquid crystals disposed therebetween, and a touch panel mounted on the liquid crystal panel, wherein the touch panel includes a sensor substrate having first and second pattern portions which function as position sensing electrodes and a shielding signal supply line formed on an upper side thereof for supplying a shielding signal, a shielding electrode formed on an underside of the sensor substrate, and two or more shielding electrode connection portions for connecting the shielding electrode to the shielding signal supply line.

20 Claims, 8 Drawing Sheets

DISPLAY DEVICE WITH AN EMBEDDED TOUCH PANEL AND A METHOD OF MANUFACTURING THE SAME

CROSS REFERENCE TO RELATED APPLICATION

This application claims the benefit of the Korean Patent Application No. 10-2010-0093641, filed on Sep. 28, 2010, which is hereby incorporated by reference in its entirety.

BACKGROUND OF THE DISCLOSURE

1. Field of the Disclosure

The present invention relates to a display device with an embedded touch panel, and more particularly to a display device with an embedded touch panel which does not require a Flexible Printed Circuit (FPC) for applying a shielding signal to a shielding electrode and thus results in reducing the manufacturing cost and simplifying the fabrication process.

2. Discussion of the Related Art

Various image display devices include, for example, cathode ray tubes CRT, liquid crystal display devices LCD, plasma display panel devices PDP, electro luminescence display devices ELD, and organic luminescence display devices. Of these display devices, the LCD device controls light transmissivity of liquid crystals by using an electric field to display a picture. For this, the liquid crystal display device is provided with a liquid crystal panel having liquid crystal cells, a backlight unit for directing a light to the liquid crystal panel, and a driving circuit unit for driving the backlight unit and the liquid crystal cells.

There has been a rapid increase of demands for a display device which also can be used as an input device by mounting a touch panel thereto, where a surface of a liquid crystal panel is pressed down with a pointer (a user's finger) to input information pertinent to the pointed position. Depending on touch sensing types, the touch panels are classified into a resistance type, a capacitive type, and an infrared ray sensing type. Recently, the capacitive type is paid attention in view of convenience of fabrication, sensing capability, and so on. The touch panel is provided with a sensor glass having electrodes formed thereon for sensing the touch by a capacitive system, and a cover glass arranged to face a sensor substrate.

In the meantime, since the touch panel is mounted to the liquid crystal panel, there has been a problem in that noise can infiltrate into the liquid crystal panel from the touch panel. And, since a signal being applied to the touch panel affects a signal being applied to the liquid crystal panel, interference between the signals take place. In order to shield the noise infiltrating into the liquid crystal panel and preventing the signal interference between the liquid crystal panel and the touch panel from taking place, a shielding electrode is formed on a back side of the touch panel.

Figure 1:
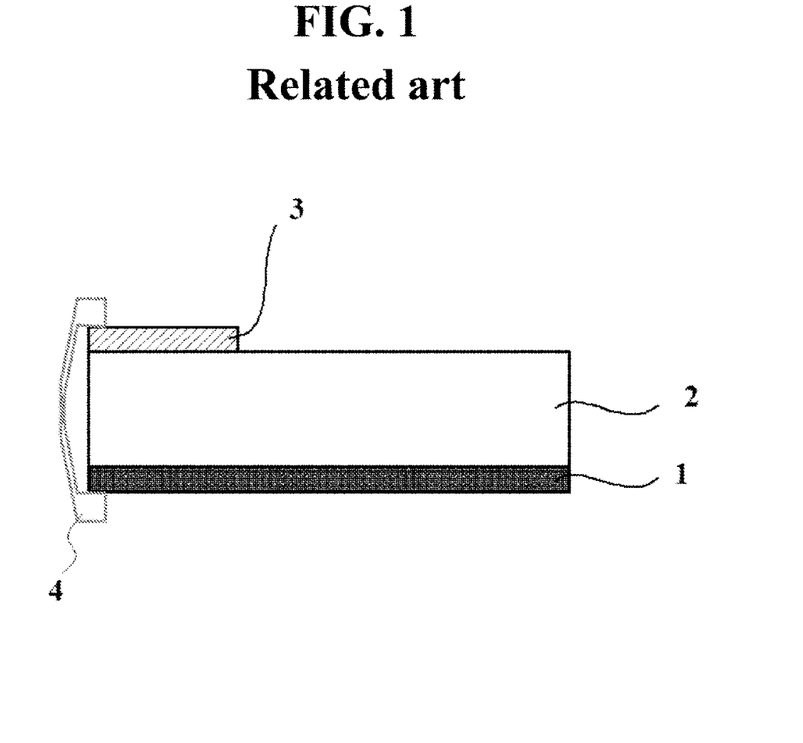
FIG. 1 illustrates a section of the touch panel in accordance with the related art.

As shown in FIG. 1, the shielding electrode 1 is formed on the back side of the touch panel 2, and a shielding signal supply line 3 is formed on a top side of the touch panel 2. Also, an additional FPC (Flexible Printed Circuit) 4 connects the shielding signal supply line 3 with the shielding electrode 1. As a ground signal is applied to the shielding electrode through the shielding signal supply line 3 and FPC 4, the noise infiltrating into the liquid crystal panel is shielded. In order to apply the ground signal to the shielding electrode, however, the FPC (Flexible Printed Circuit) 4 FPC mounted to the underside of the shielding electrode is required. Consequently, the number of FPC increases, increasing cost and to cause a fabrication process complicate.

SUMMARY OF THE DISCLOSURE

The present invention is directed to a display device with an embedded touch panel and a method of manufacturing the same.

One object of the present invention is to provide a display device with an embedded touch panel which does not require an FPC mounted to the underside of a shielding electrode for applying a shielding signal to the shielding electrode, and to reduce the manufacturing cost and simplify the fabrication process.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, as embodied and broadly described herein, a touch panel embedded display device may include a liquid crystal panel having an upper substrate and a lower substrate faced to each other with liquid crystals disposed therebetween, and a touch panel mounted on the liquid crystal panel, wherein the touch panel includes a sensor substrate having first and second pattern portions which function as position sensing electrodes and a shielding signal supply line formed on an upper side thereof for supplying a shielding signal, a shielding electrode formed on an underside of the sensor substrate, and two or more shielding electrode connection portions for connecting the shielding electrode to the shielding signal supply line.

In this instance, the shielding electrode connection portions according to some embodiments may have a shape of a ring to cover the shielding electrode and a portion of the shielding signal supply line.

In other embodiments, the shielding electrode connection portions may have a shape of a ring to cover a portion of the shielding signal supply line and the shielding electrode, entirely.

In additional embodiments, the shielding electrode connection portions may be formed at some of the four corners of the sensor substrate, where the shielding electrode connection positions may optionally be at a center of two of the four corners.

In further embodiments, the two or more shielding electrode connection portions can be formed at opposite two corners of the sensor substrate in a diagonal direction.

In yet further embodiments, the shielding electrode connection portions can be formed of silver Ag, gold Au, tungsten W, titanium Ti, molybdenum Mo, conductive polymer, conductive tape, indium tin oxide ITO, indium zinc oxide IZO, indium tin zinc oxide ITZO, antimony tin oxide ATO, transparent conductive electrode material, or metal.

In some embodiments, the shielding electrode connection portions are formed by coating, dipping, spraying, and adhesion of the conductive material.

The present invention according to other embodiments includes a method of manufacturing a touch panel embedded display device including: forming a liquid crystal panel having an upper substrate and a lower substrate faced to each other with liquid crystals disposed therebetween; and forming a touch panel mounted on the liquid crystal panel, where the step of forming the touch panel includes; forming a sensor substrate having first and second pattern portions which function as position sensing electrodes and a shielding signal supply line formed on an upper side thereof for supplying a shielding signal, forming a shielding electrode formed on an underside of the sensor substrate, and forming two or more shielding electrode connection portions for connecting the shielding electrode to the shielding signal supply line by coating, dipping or spraying. In yet other embodiments, the shielding electrode connection portions can be configured according to the embodiments described above.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings are included to provide a further understanding of the disclosure and are incorporated in and constitute a part of this application. The drawings illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the present invention.

Exemplary embodiments of the present invention will be described with reference to FIGS. 2 to 6C.

Figure 2:
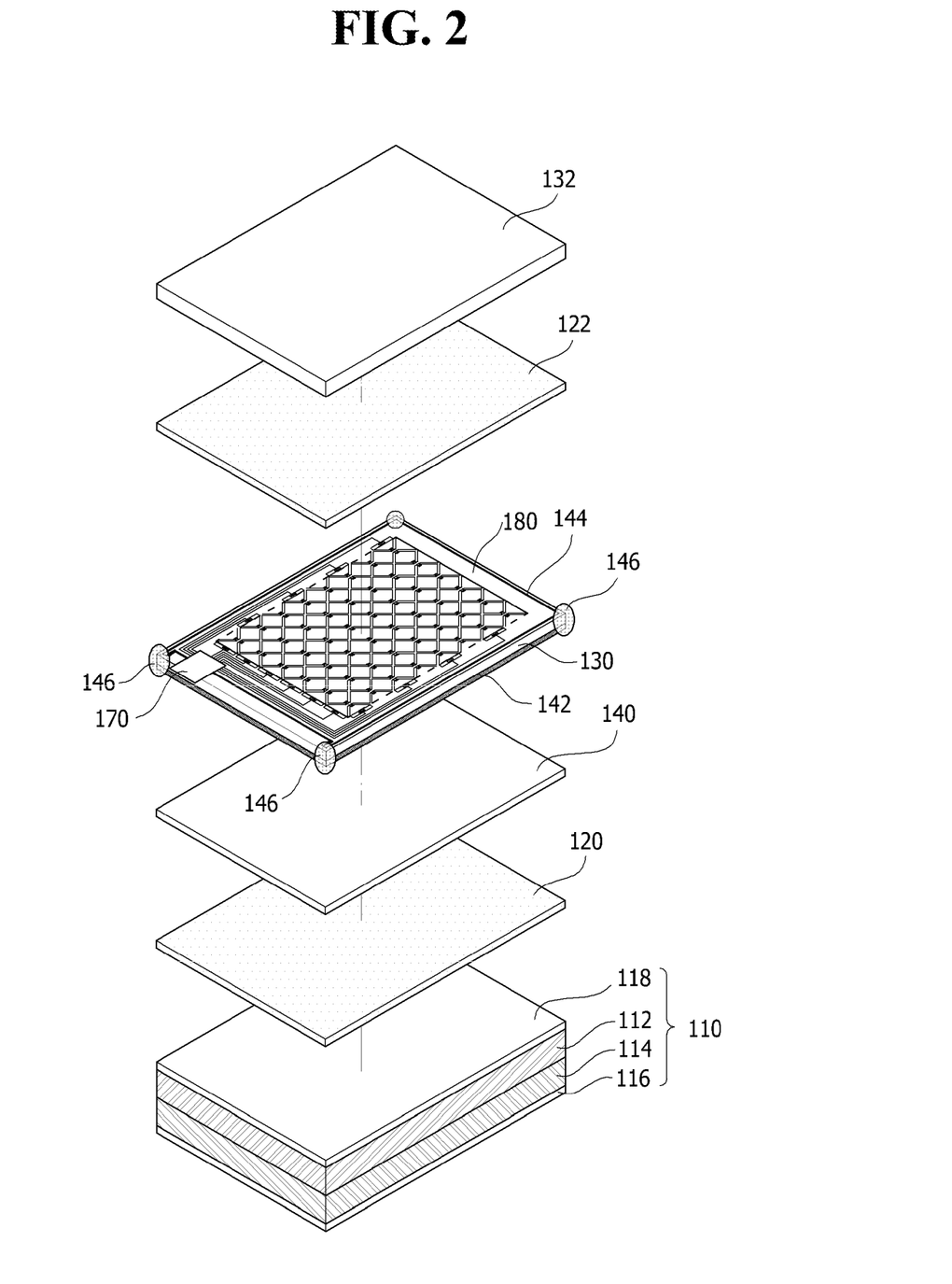
FIG. 2 illustrates an exploded perspective view of a display device with an embedded touch panel in accordance with one embodiment of the present invention.
Figure 3:
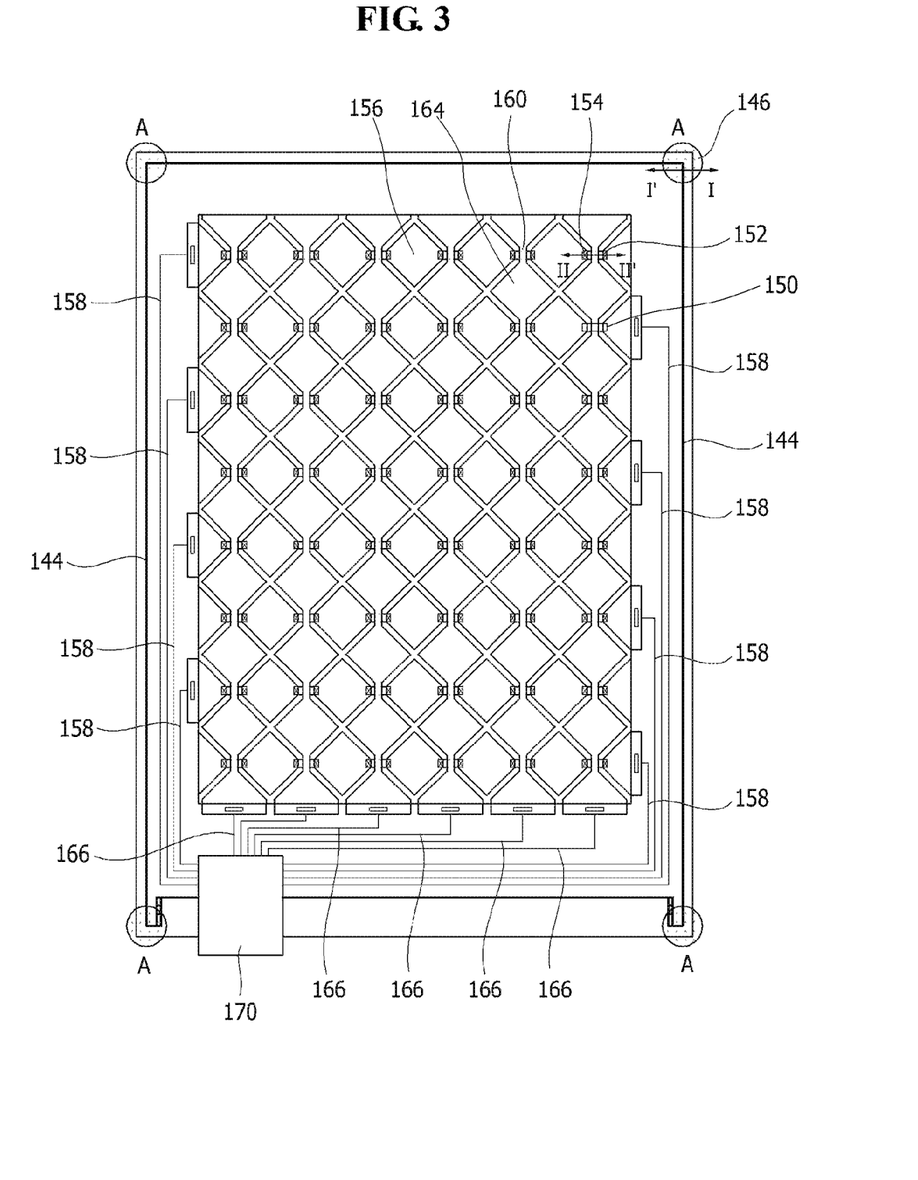
FIG. 3 illustrates a plan view of the touch panel in FIG. 2.

FIG. 2 illustrates an exploded perspective view of a display device with an embedded touch panel in accordance with one embodiment of the present invention, and FIG. 3 illustrates a plan view of the touch panel in FIG. 2.

Referring to FIG. 2, the display device with an embedded touch panel may include a liquid crystal panel 110 and a touch panel 180 mounted on the liquid crystal panel 110. Although a display device with an embedded touch panel is described herein as a liquid crystal panel according to one embodiment of the present invention, besides the liquid crystal panel, other panels, including flat display panels, can be used as a display device incorporating the touch panel described herein.

The liquid crystal panel 110 may include an upper substrate 112 having color filters; a lower substrate 114 having thin film transistors formed thereon, each of which is connected to a gate line and a data line, and pixel electrodes connected to the thin film transistors; an upper polarizing plate 118 attached to a front of the upper substrate 112; and a lower polarizing plate 116 attached to the lower substrate 114. In some embodiments, the color filters may include R, G, B, color filters producing red, green, and blue colors, respectively.

A common electrode of a transparent conductive film can be formed on a back side of the upper substrate 112 to form a vertical electric field with the pixel electrode. Also, a common electrode of a transparent conductive film can be formed on a lower substrate 114 to form a horizontal electric field with the pixel electrode. The common electrode has a reference voltage, i.e., a common voltage, supplied thereto for driving the liquid crystals.

The thin film transistor can be formed on the lower substrate 114 for selective supply of a data signal from the data line to the pixel electrode in response to a gate signal from the gate line. For this, the thin film transistor has a gate electrode connected to the gate line, a source electrode connected to the data line, a drain electrode connected to the pixel electrode, an active layer overlapped with the gate electrode with a gate insulating film disposed therebetween to form a channel between the source electrode and the drain electrode, and an ohmic contact layer for making the active layer to cause ohmic contact to the source electrode and the drain electrode.

The pixel electrode can be formed independently to overlap with each of the color filters R, G, B at the pixel regions and connected to the drain electrode of the thin film transistor. And, the pixel electrode can be overlapped with the common electrode and the liquid crystal layer disposed therebetween to form the vertical electric field, or formed on the same substrate to form the horizontal electric field. Upon receiving the data signal, the pixel electrode can form the vertical electric field or the horizontal electric field with the common electrode having the common voltage applied thereto, to cause the liquid crystal molecules arranged in a vertical direction to rotate owing to the dielectric anisotropy. And, variation of light transmissivity on the light passing through the pixel region with an extent of rotation of the liquid crystal molecules produces gradients.

The upper polarizing plate 118 is formed on an upper side of the upper substrate 112 of the liquid crystal panel 110. The upper polarizing plate 118 can control a transmitting light quantity and a polarizing state of the light incident thereon from the liquid crystal panel 110.

The lower polarizing plate 116 is formed on the back side of the lower substrate 114 of the liquid crystal panel 110. The lower polarizing plate 116 controls the transmitting light quantity and the polarizing state of the light incident thereon from the backlight unit.

According to the embodiment shown in FIGS. 2 and 3, the touch panel 180 may include a sensor substrate 130 having first electrode patterns (160, 164) and second electrode patterns (150, 156) formed thereon to function as sensing electrodes, a cover substrate 132 to face the sensor substrate 130, a shielding electrode 142 formed on an entire surface of an underside of the sensor substrate 130, a first adhesive layer 120 formed on the upper polarizing plate 118, a shielding electrode connection portion 146 for connecting the shielding electrode 142 to a shielding signal supply line 144, a bottom insulating layer 140 formed on a backside of the shielding electrode 142, and a second adhesive layer 122 formed on the sensor substrate 130. In this instance, the sensor substrate 130 and the cover substrate 132 can be formed of transparent glass.

The sensor substrate 130 includes a first electrode pattern portion 160 and 164, a second electrode pattern portion 150 and 156, a first signal supply line 166, a second signal supply line 158, a shielding signal supply line 144, and a sensor FPC (Flexible Printed Circuit, hereafter FPC) 170.

The first electrode pattern portion 160 and 164 is formed in plural in a number thereof in a first direction parallel to one another for sensing first direction capacitance. In one aspect, the first direction can be, for an example, a Y-axis direction. The first electrode pattern portion 160 and 164 includes diamond shaped first body portions 164 and connection portions 160 for connecting adjacent first body portions 164. In another aspect, the first electrode pattern portion 160 and 164 is electrically connected to the first signal supply line 166 to have a signal supplied thereto. The first electrode pattern portion 160 and 164 can be formed of a transparent material on an insulating layer. The transparent material can include a material(s) including, but not limited to, indium tin oxide ITO, indium zinc oxide IZO, indium tin zinc oxide ITZO, or antimony tin oxide ATO.

The second electrode pattern portion 150 and 156 is formed to cross the first electrode pattern portion 160 and 164 in plural in a number thereof in a second direction parallel to one another for sensing second direction capacitance. In this instance, the second direction can be, for an example, an X-axis direction. The second electrode pattern portion 150 and 156 includes diamond shaped second body portions 156 and bridges 150 for connecting adjacent second body portions 156 through contact holes 152 and 154. In this instance, the second electrode pattern portion 150 and 156 is electrically connected to the second signal supply line 158 to have a signal supplied thereto. The second electrode pattern portion 150 and 156 can be formed of a transparent material on an insulating layer. The transparent material can include a material(s) including, but not limited to, indium tin oxide ITO, indium zinc oxide IZO, indium tin zinc oxide ITZO, or antimony tin oxide ATO.

Figure 4:
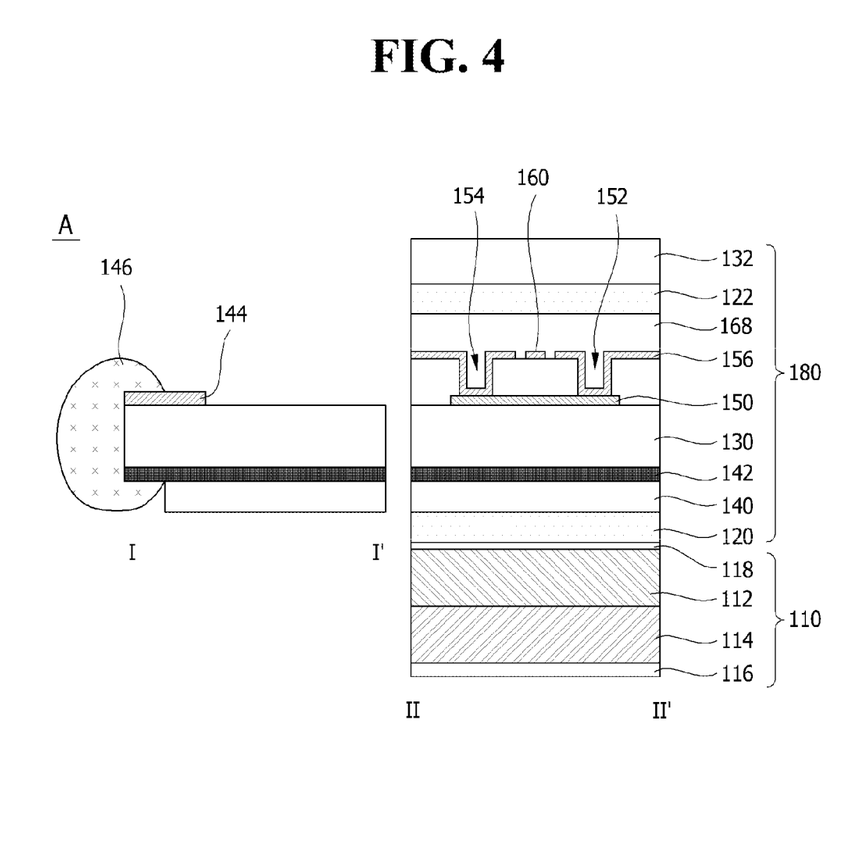
FIG. 4 illustrates sections across lines I-I' and II-II' in FIG. 3.
Figure 5:
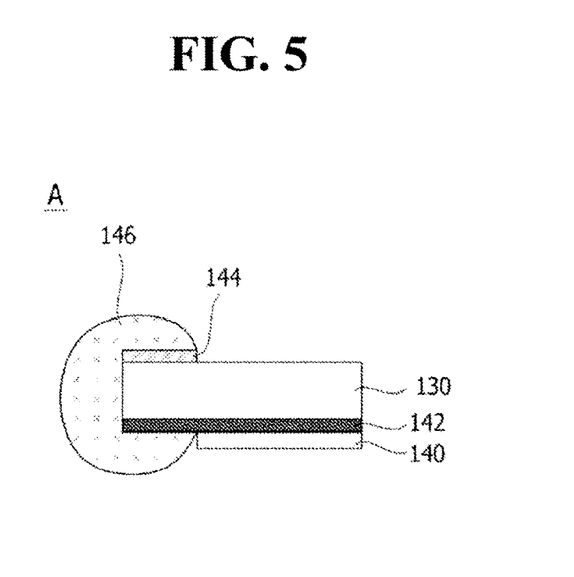
FIG. 5 illustrates a section of the shielding electrode connection portion in FIG. 2.

FIG. 4 illustrates sections across lines I-I' and II-II' in FIG. 3, and FIG. 5 illustrates a section of the shielding electrode connection portion according to another embodiment of the present invention.

The shielding signal supply line 144 is connected to the sensor FPC 170 for supplying a shielding signal to the shielding electrode 142 through the shielding electrode connection portion 146 to cut off noise transmitting into the liquid crystal panel 110. In this instance, the shielding signal can be, for an example, a ground GND signal for cutting off the noise transmitting to the liquid crystal panel. And, the shielding signal supply line 144 on an upper side of the sensor substrate 130 and the shielding electrode 142 on an underside of the sensor substrate 130 are connected electrically with the shielding electrode connection portion 146.

The shielding electrode 142 formed on an entire surface of an underside of the sensor substrate 130 for having the shielding signal supplied thereto from the shielding signal supply line 144 to cut off the noise infiltrating into the liquid crystal panel 110. By cutting off the noise infiltrating into the liquid crystal panel 110 thus, preventing the signal being applied to the touch panel 180 from affecting the signal being applied to the liquid crystal panel 110, no interference between the signals takes place. The shielding electrode 142 is formed of a transparent material, including, but not limited to, indium tin oxide ITO, indium zinc oxide IZO, indium tin zinc oxide ITZO, and antimony tin oxide ATO.

A shielding electrode connection portion 146 (A region) is formed at a periphery of the sensor substrate 130 to connect the shielding electrode 142 with the shielding signal supply line 144. That is, as shown in FIG. 4, the shielding electrode connection portion 146 is formed to have a ring shape to cover both a portion of the shielding electrode 142 and a portion of the shielding signal supply line 144, making the shielding electrode 142 to be connected to the shielding signal supply line 144. As shown in FIGS. 3 and 4, the shielding electrode connection portion 146 can be formed at four corners of the sensor substrate 130, and the shape is not limited to the ring shape and can have a variety of shapes.

The shielding electrode connection portion 146 can be formed of a conductive material including, for an example, silver Ag, gold Au, tungsten W, titanium Ti, molybdenum Mo, conductive polymer, conductive tape, indium tin oxide ITO, indium zinc oxide IZO, indium tin zinc oxide ITZO, antimony tin oxide ATO, transparent conductive electrode material, or metal. The shielding electrode connection portion 146 can be formed by coating, dipping, spraying, adhesion, and so on of the conductive material. And, as shown in FIG. 4, the shielding electrode connection portion 146 can be formed to cover a portion of the shielding electrode 142, or as shown in FIG. 5, to cover an entire shielding electrode 142.

In the meantime, proper supply of the ground signal GND becomes more difficult as the distance from the sensor FPC 170 becomes the greater. Therefore, the ground signal GND can not be supplied to the shielding electrode 142 which is formed at a region far from the sensor FPC 170 properly, and cutting off of the noise infiltrating into the liquid crystal panel 110 through the shielding electrode 142 is difficult. By forming the shielding electrode connection portion 146 at both ends of the corners of the region far from the sensor FPC 170, however, uniform supply of the ground signal GND to the shielding electrode 142 is made possible. A testing module using a connective tape was used to determine whether the shielding electrode on the underside of the sensor substrate was properly connected to the shielding signal supply line on the upper side of the sensor substrate through the shielding electrode connection portion. As can be noted in the drawings, the shielding electrode is connected properly to the shielding signal supply line with the shielding electrode connection portion even to a region far from the sensor FPC 170. Accordingly, by having two or more shielding electrode connection portions in the touch panel, the ground signal GND is supplied uniformly to the shielding electrode regardless of the distance from the sensor FPC 170.

And, though the related art touch panel has an FPC formed on an underside of the sensor substrate 130 for supplying the shielding signal to the shielding electrode 142 formed on and underside of the sensor substrate 130, the present invention can reduce a production cost since the shielding signal is supplied to the shielding electrode 142 through the shielding electrode connection portion 146 without an FPC mounted to the underside of the shielding electrode. Moreover, the shielding electrode connection portion 146, not only can connect the shielding electrode 142 to the shielding signal supply line 144, but also can prevent static electricity from taking place.

The first adhesive layer 120 shown in FIG. 4 can be formed of a transparent adhesive material having high light transmissivity on the upper polarizing plate 118 of the liquid crystal panel 110. The transparent adhesive material can be, for an example, SVR (Super View Resin).

The second adhesive layer 122 also shown in FIG. 4 can be formed of a transparent adhesive material having high light transmissivity on the insulating layer 168 of the sensor substrate 130. The transparent adhesive material can be, for an example, SVR (Super View Resin).

Figure 6A:
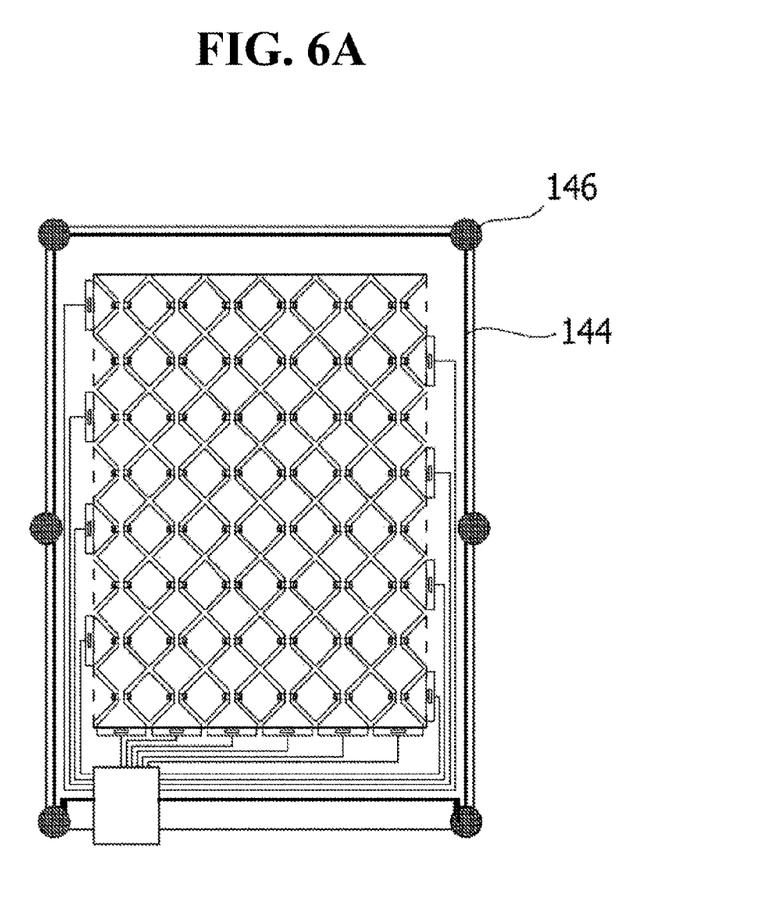
FIGS. 6A-6C illustrate plan views showing touch panels in accordance with other embodiments of the present invention.
Figure 6B:
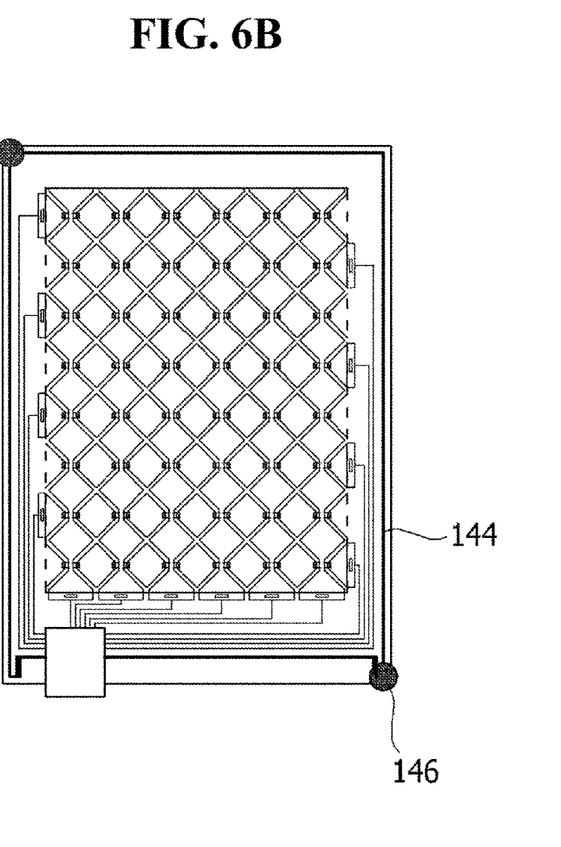
Figure 6C:
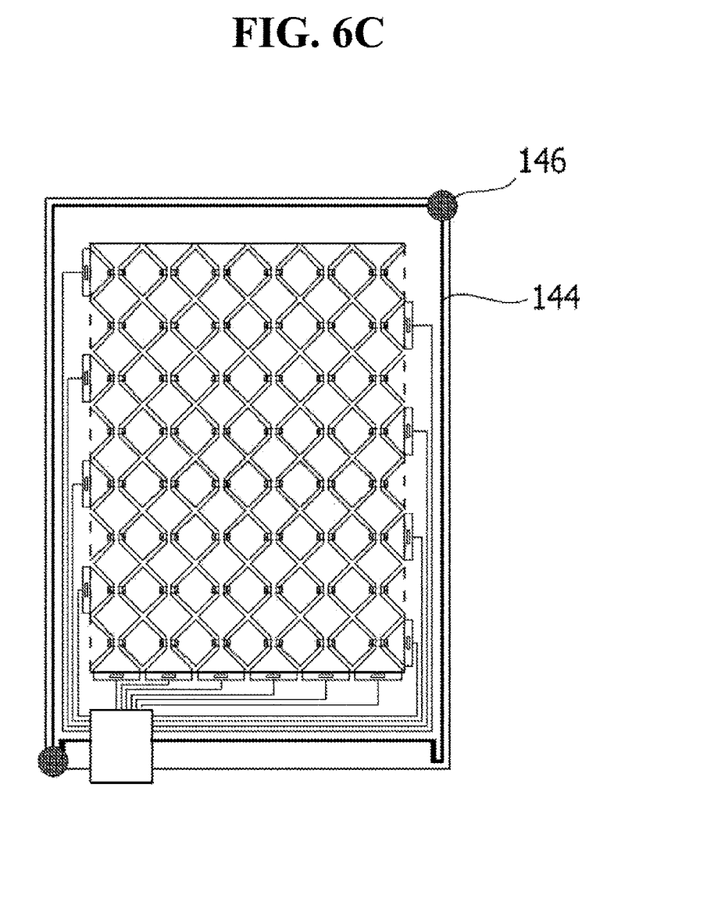

FIGS. 6A-6C illustrate plan views showing touch panels in accordance with other embodiments of the present invention. Since the touch panel in accordance with these embodiments of the present invention can be identical to the touch panel described above except the shielding electrode connection portion, description of the identical parts will be omitted.

The shielding electrode connection portion 146 can be formed at least two in number on a periphery of the sensor substrate 130 and connects the shielding electrode 142 on an underside of the sensor substrate 130 to the shielding signal supply line 144 on an upper side of the sensor substrate 130. In other words, the shielding electrode connection portion 146 is formed in a ring shape to cover a portion of the shielding electrode 142 and a portion of the shielding signal supply line 144 and connects the shielding electrode 142 to the shielding signal supply line 144. As shown in FIG. 6A, the shielding electrode connection portion 146 can be formed at four corners of the sensor substrate 130 and at least one at a center of two of the four corners, or, as shown in FIGS. 6B and 6C, at opposite two corners in a diagonal direction. Thus, the shielding electrode connection portion 146 can be formed at least as shown in FIGS. 6A-6C, and the position and a number thereof are not limited to above.

The shielding electrode connection portion 146 can be formed of a conductive material, for an example, silver Ag, gold Au, tungsten W, titanium Ti, molybdenum Mo, conductive polymer, conductive tape, indium tin oxide ITO, indium zinc oxide IZO, indium tin zinc oxide ITZO, antimony tin oxide ATO, transparent conductive electrode material, or metal. The shielding electrode connection portion 146 can be formed by coating, dipping, spraying, adhesion, and so on of the conductive material. And, as shown in FIG. 3, the shielding electrode connection portion 146 can be formed to cover a portion of the shielding electrode 142, or as shown in FIG. 4, to cover an entire shielding electrode 142.

As described herein, the display device with an embedded touch panel according to the above embodiments of the present invention has at least the following advantages.

The connection of the shielding electrode to the shielding signal supply line with the shielding electrode connection portion permits to eliminate an additional FPC mounted to the underside of the sensor substrate for supplying the shielding signal. That is, by using one FPC formed on the upper side of the sensor substrate, the shielding signal can be supplied to the shielding electrode through the shielding electrode connection portion. Eliminating an additional FPC on the underside of the sensor substrate permits to reduce a production cost.

And, the formation of the shielding electrode connection portions at opposite ends of the region far from the FPC permits uniform supply of the shielding signal throughout the shielding electrode without being affected by resistance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch panel embedded display device, comprising:
a liquid crystal panel comprising an upper substrate and a lower substrate faced to each other with liquid crystals disposed therebetween; and
a touch panel mounted on the liquid crystal panel the touch panel comprising:
a sensor substrate, comprising:
first and second pattern portions configured as position sensing electrodes; and
a shielding signal supply line formed on an upper side of the sensor substrate and configured to supply a shielding signal;
a shielding electrode on an underside of the sensor substrate, and
two or more shielding electrode connection portions at outer edges of the touch panel and configured to connect the shielding electrode to the shielding signal supply line wherein the two or more shielding electrode connection portions protrude laterally from the outer edges of the touch panel.

2. The device as claimed in claim 1, wherein the shielding electrode connection portions have a shape of a ring and are configured to cover the shielding electrode and a portion of the shielding signal supply line.

3. The device as claimed in claim 2, wherein the shielding electrode connection portions have a shape of a ring and are configured to cover the shielding electrode and a portion of the shielding signal supply line, entirely.

4. The device as claimed in claim 1, wherein the shielding electrode connection portions are on a periphery of the sensor substrate and are configured to connect the shielding electrode to the shielding signal supply line.

5. The device as claimed in claim 1, wherein the shielding electrode connection portions are at corners of the sensor substrate.

6. The device as claimed in claim 1, wherein:
at least one of the shielding electrode connection portions is at one of four corners of the sensor substrate; and
at least one shielding electrode connection portion is at a center of two of the four corners.

7. The device as claimed in claim 1, wherein the shielding electrode connection portions are at opposite two corners of the sensor substrate in a diagonal direction.

8. The device as claimed in claim 1, wherein the shielding electrode connection portions comprise one or more of: silver (Ag), gold (Au), tungsten (W), titanium (Ti), molybdenum (Mo), conductive polymer, conductive tape, indium tin oxide (ITO), indium zinc oxide (IZO), indium tin zinc oxide (ITZO), antimony tin oxide (ATO), a transparent conductive electrode material, and a metal.

9. The device as claimed in claim 8, wherein the shielding electrode connection portions comprise one or more of: ITO, IZO, ITZO, ATO, and a transparent conductive electrode material.

10. The device as claimed in claim 1, wherein the shielding electrode connection portions are formed by one or more of: coating, dipping, spraying, and adhesion of the conductive material.

11. A method of manufacturing a touch panel embedded display device, the method comprising:
forming a liquid crystal panel comprising an upper substrate and a lower substrate faced to each other with liquid crystals disposed therebetween; and
forming a touch panel mounted on the liquid crystal panel, the forming the touch panel; comprising:
forming a sensor substrate comprising:
first and second pattern portions as position sensing electrodes; and
a shielding signal supply line formed on an upper side of the sensor substrate for supplying a shielding signal,
forming a shielding electrode on an underside of the sensor substrate, and
forming two or more shielding electrode connection portions at outer edges of the touch panel for connecting the shielding electrode to the shielding signal supply line by one or more of: coating, dipping, or spraying wherein the two or more shielding electrode connection portions protrude laterally from the outer edges of the touch panel.

12. The method as claimed in claim 11, wherein the shielding electrode connection portions have a shape of a ring to cover the shielding electrode and a portion of the shielding signal supply line.

13. The method as claimed in claim 12, wherein the shielding electrode connection portions have a shape of a ring to cover the shielding electrode and a portion of the shielding signal supply line, entirely.

14. The method as claimed in claim 11, wherein the shielding electrode connection portions are on a periphery of the sensor substrate for connecting the shielding electrode to the shielding signal supply line.

15. The method as claimed in claim 11, wherein the two shielding electrode connection portions are at corners of the sensor substrate.

16. The method as claimed in claim 11, wherein:
at least one of the shielding electrode connection portions is at one of four corners of the sensor substrate; and
at least one shielding electrode connection portion is at a center of two of the four corners.

17. The method as claimed in claim 11, wherein the shielding electrode connection portions are at opposite two corners of the sensor substrate in a diagonal direction.

18. The method as claimed in claim 11, wherein the shielding electrode connection portions comprise one or more of: silver (Ag), gold (Au), tungsten (W), titanium (Ti), molybdenum (Mo), conductive polymer, conductive tape, indium tin oxide (ITO), indium zinc oxide (IZO), indium tin zinc oxide (ITZO), antimony tin oxide (ATO), a transparent conductive electrode material, and a metal.

19. The method as claimed in claim 18, wherein the shielding electrode connection portions comprise one or more of: ITO, IZO, ITZO, ATO, and a transparent conductive electrode material.

20. A touch panel embedded display device, comprising:
a liquid crystal panel comprising an upper substrate and a lower substrate faced to each other with liquid crystals disposed therebetween; and
a touch panel mounted on the liquid crystal panel the touch panel comprising:
a sensor substrate, comprising:
first and second pattern portions configured as position sensing electrodes, the first pattern portion connected to a first signal supply line, the second pattern portion connected to a second signal supply line different from the first signal supply line; and
a shielding signal supply line formed on an upper side of the sensor substrate and configured to supply a shielding signal;
a shielding electrode on an underside of the sensor substrate, and
two or more shielding electrode connection portions at outer edges of the touch panel and configured to connect the shielding electrode to the shielding signal supply line,
wherein the two or more shielding electrode connection portions are on a lateral surface of the sensor substrate wherein the two or more shielding electrode connection portions protrude laterally from the outer edges of the touch panel.

* * * * *